United States Patent
Gonze et al.

(10) Patent No.: US 8,156,737 B2
(45) Date of Patent: Apr. 17, 2012

(54) ELEVATED EXHAUST TEMPERATURE, ZONED, ELECTRICALLY-HEATED PARTICULATE MATTER FILTER

(75) Inventors: Eugene V. Gonze, Pinckney, MI (US); Michael J. Paratore, Jr., Howell, MI (US); Garima Bhatia, Bangalore (IN)

(73) Assignee: GM Global Technology Operations LLC

( * ) Notice: Subject to any disclaimer, the term of this patent is extended or adjusted under 35 U.S.C. 154(b) by 771 days.

(21) Appl. No.: 11/941,545

(22) Filed: Nov. 16, 2007

(65) Prior Publication Data

US 2009/0071124 A1 Mar. 19, 2009

Related U.S. Application Data

(60) Provisional application No. 60/973,321, filed on Sep. 18, 2007.

(51) Int. Cl.
*F01N 3/00* (2006.01)

(52) U.S. Cl. ............... 60/297; 60/274; 60/286; 60/295; 60/300

(58) Field of Classification Search ........... 60/274, 60/286, 295, 297, 300, 303, 311, 285
See application file for complete search history.

(56) References Cited

U.S. PATENT DOCUMENTS

| | | | |
|---|---|---|---|
| 4,505,726 A | 3/1985 | Takeuchi | |
| 4,516,993 A | 5/1985 | Takeuchi | |
| 4,723,973 A * | 2/1988 | Oyobe et al. | 55/466 |
| 4,872,889 A | 10/1989 | Lepperhoff et al. | |
| 4,974,414 A | 12/1990 | Kono et al. | |
| 5,711,149 A * | 1/1998 | Araki | 60/278 |
| 5,846,276 A * | 12/1998 | Nagai et al. | 55/523 |
| 6,090,172 A * | 7/2000 | Dementhon et al. | 55/282.3 |
| 6,304,815 B1 * | 10/2001 | Moraal et al. | 701/115 |
| 6,770,116 B2 * | 8/2004 | Kojima | 95/14 |
| 6,865,883 B2 * | 3/2005 | Gomulka | 60/295 |
| 7,249,456 B2 * | 7/2007 | Schulte et al. | 60/295 |
| 7,550,119 B2 * | 6/2009 | Kojima | 422/180 |

FOREIGN PATENT DOCUMENTS

| | | |
|---|---|---|
| CN | 1471611 A | 1/2004 |
| CN | 1554860 A | 12/2004 |
| CN | 1934338 A | 3/2007 |
| CN | 1936283 A | 3/2007 |
| DE | 3712333 A1 | 10/1988 |
| DE | 3890556 C2 | 1/1993 |
| DE | 69502624 T2 | 12/1998 |
| WO | WO96/03571 | 2/1996 |

* cited by examiner

*Primary Examiner* — Binh Q Tran

(57) ABSTRACT

A system includes an electrical heater and a particulate matter (PM) filter that is arranged one of adjacent to and in contact with the electrical heater. A control module selectively increases an exhaust gas temperature of an engine to a first temperature and that initiates regeneration of the PM filter using the electrical heater while the exhaust gas temperature is above the first temperature. The first temperature is greater than a maximum exhaust gas temperature at the PM filter during non-regeneration operation and is less than an oxidation temperature of the PM.

20 Claims, 10 Drawing Sheets

ELEVATED EXHAUST TEMPERATURE, ZONED, ELECTRICALLY-HEATED PARTICULATE MATTER FILTER

CROSS-REFERENCE TO RELATED APPLICATIONS

This application claims the benefit of U.S. Provisional Patent Application No. 60/973,321, filed on Sep. 18, 2007. This application is incorporated herein by reference in its entirety.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to elevated exhaust temperature, zoned, electrically-heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

SUMMARY

A system comprises an electrical heater and a particulate matter (PM) filter that is arranged one of adjacent to and in contact with the electrical heater. A control module selectively increases an exhaust gas temperature of an engine to a first temperature and initiates regeneration of the PM filter using the electrical heater while the exhaust gas temperature is above the first temperature. The first temperature is greater than a maximum exhaust gas temperature at the PM filter during non-regeneration operation and is less than an oxidation temperature of the PM.

A method comprising providing an electrical heater, arranging a particulate matter (PM) filter one of adjacent to and in contact with the electrical heater, and selectively increasing an exhaust gas temperature of an engine to a first temperature, and initiating regeneration of the PM filter using the electrical heater while the exhaust gas temperature is above the first temperature. The first temperature is greater than a maximum exhaust gas temperature at the PM filter during non-regeneration operation and is less than an oxidation temperature of the PM.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
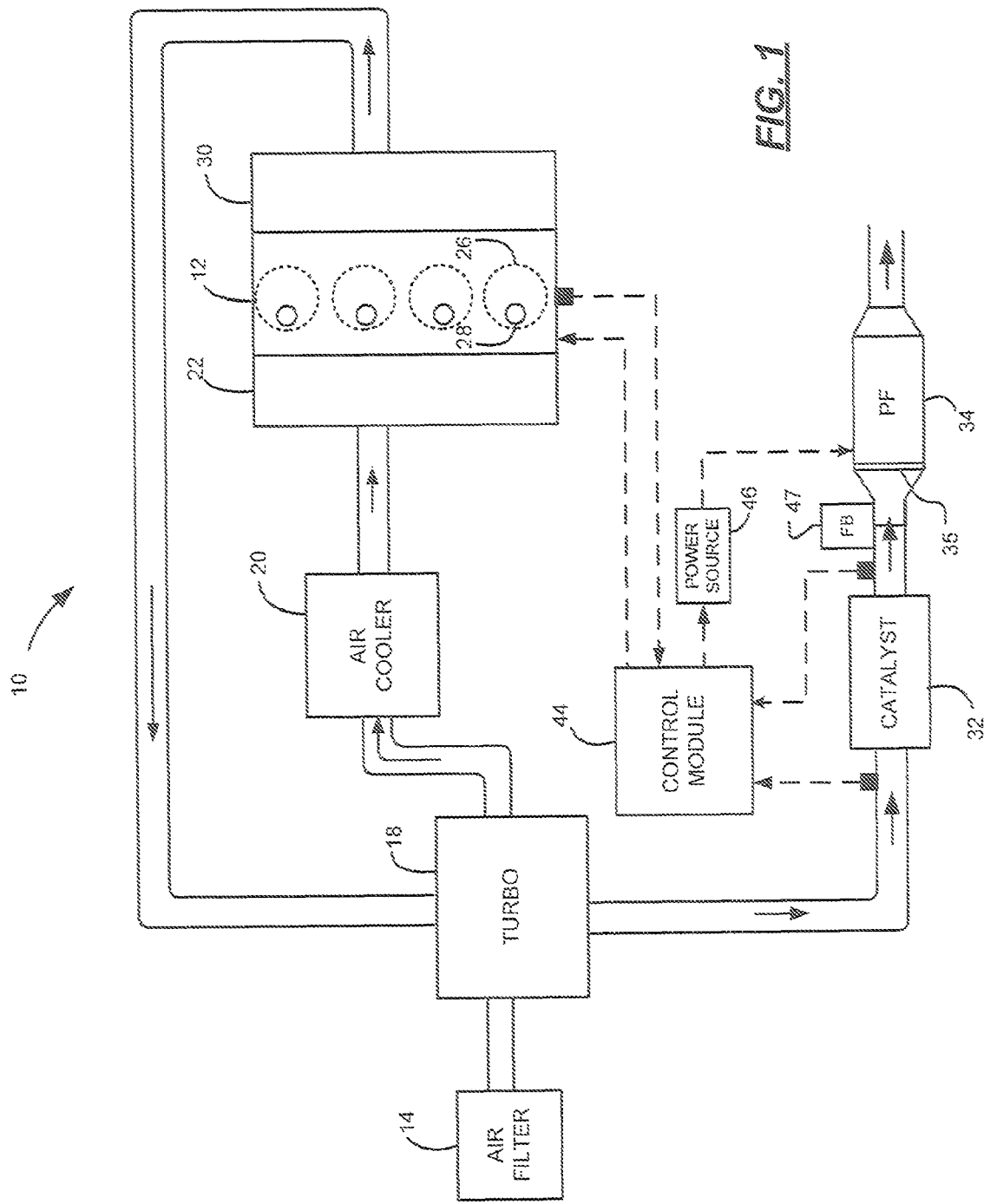
FIG. 1 is a functional block diagram of an exemplary engine including a particulate matter (PM) filter with a zoned inlet heater.

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure increases input exhaust temperature before performing regeneration using an electrical heater to enable more robust PM filter regeneration. For example only, the inlet exhaust temperature may be raised above maximum exhaust gas temperature at the PM filter encountered during normal operation and less than a soot oxidation temperature. The temperature of the exhaust gas entering an inlet of the PM filter may be increased by modifying engine management, using a fuel burner, using a catalytic oxidizer to increase the exhaust temperature with after injection of fuel, and/or other suitable approaches.

For example only, the exhaust temperature may be raised to a temperature range between 340 to 540 degrees Celsius. This temperature range is lower than typical soot oxidation temperature but higher than the natural exhaust temperature. Typically, high efficiency engines operate cooler than about 300 degrees Celsius.

Once the exhaust gas temperature to the PM filter is raised, the electrical heater activates heated zones, which causes a soot combustion wave to travel down the PM filter channel to clean the filter. This process continues until all of the heater zones are regenerated. When PM filter regeneration is run with an inlet exhaust temperature in this increased temperature range described herein, the combustion flamefronts are less likely to be extinguished. The increased inlet exhaust temperature also creates a smaller temperature delta, which reduces thermal stress forces on the PM filter.

The electrical heater can be zoned or unzoned. The electrical heater may be in contact with or spaced from the PM filter. The heater selectively heats all or portions of the PM filter. The PM filter may be in contact with or mounted close enough to the front of the PM filter to control the heating pattern. The length of the heater may be set to optimize the exhaust gas temperature.

Thermal energy is transmitted from the electric heater to the PM filter. The PM filter may be heated by convection and/or conduction. The electrical heater may be divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter may be regenerated by selectively heating one or more of the zones in the front of the PM filter and igniting the soot using the heated exhaust gas. When a sufficient face temperature is reached, the heater may be turned off and the burning soot then cascades down the length of the PM filter channel, which is similar to a burning fuse on a firework. The burning soot is the fuel that continues the regeneration. This process is continued for each heating zone until the PM filter is completely regenerated.

The heater zones may be spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

A largest temperature gradient tends to occur at edges of the zoned heaters. Therefore, activating one heater past the localized stress zone of another heater enables more actively heated regeneration volume without an increase in overall stress. This tends to improve the regeneration opportunity within a drive cycle and reduces cost and complexity since the system does not need to regenerate as many zones independently.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PM filter) assembly 34 with an inlet heater 35. The heater 35 may be zoned. Optionally, an EGR valve (not shown) recirculates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The inlet heater 35 is in contact with or spaced from the PM filter assembly 34 and heats the exhaust to a regeneration temperature as will be described below.

A control module 44 controls the engine and PM filter regeneration based on various sensed information. More specifically, the control module 44 estimates loading of the PM filter assembly 34. When the estimated loading is at a predetermined level and the exhaust flow rate is within a desired range, current may be controlled to the PM filter assembly 34 via a power source 46 to initiate the regeneration process. The duration of the regeneration process may be varied based upon the estimated amount of particulate matter within the PM filter assembly 34.

Current is applied to the heater 35 during the regeneration process. More specifically, the energy may heat selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection and/or conduction. The remainder of the regeneration process may be achieved using the heat generated by the heated exhaust passing through the PM filter.

The control module may increase the temperature of the exhaust gas entering an inlet of the PM filter using any suitable approach. For example, engine management may modifying engine management such as the timing or amount of fuel supplied to the cylinders. Alternately, a fuel burner 47 may be used. The fuel burner 47 may be arranged in the exhaust and may burn fuel supplied thereto. Alternately, the catalytic oxidizer may be used to increase the exhaust temperature with after injection of fuel.

Figure 2:
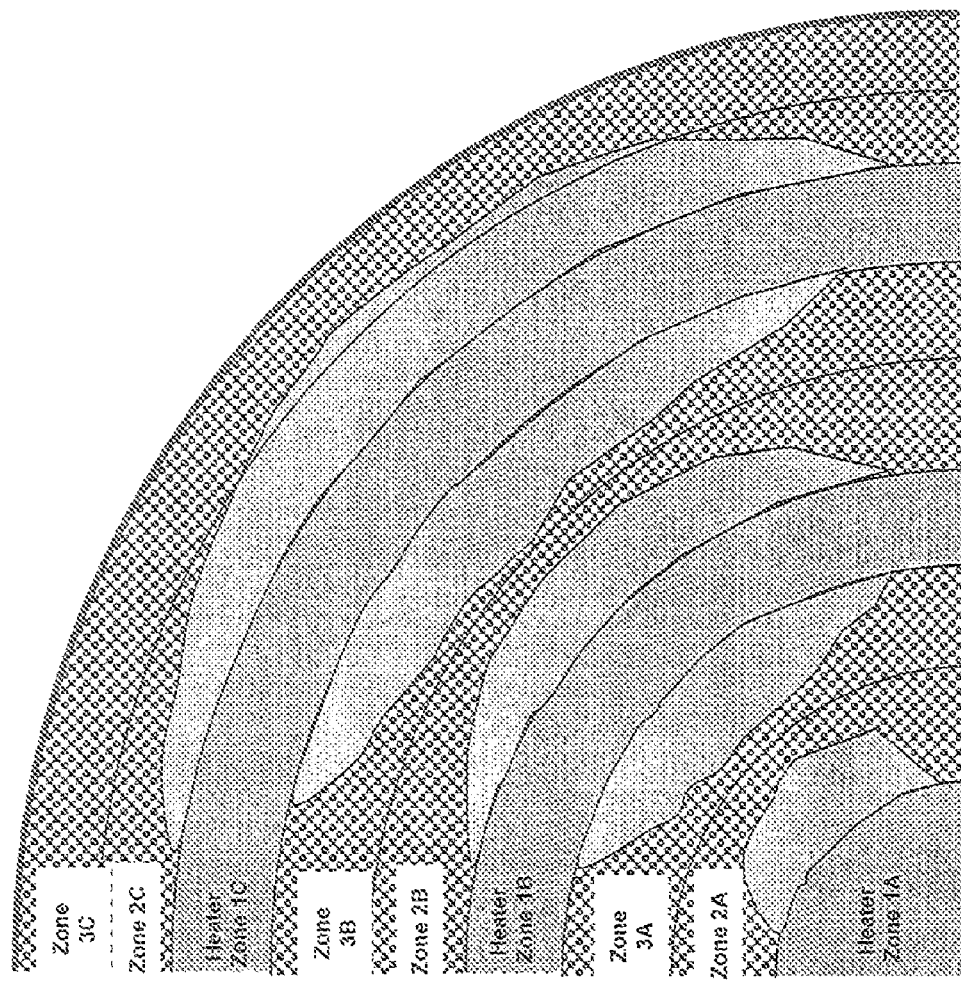
FIG. 2 illustrates exemplary zoning of the zoned inlet heater of the electrically heated particulate matter (PM) filter of FIG. 1 in further detail.

Referring now to FIG. 2, an exemplary zoned inlet heater 35 for the PM filter assembly 34 is shown in further detail. The electrically heated PM filter assembly 34 is arranged spaced from or in contact with the PM filter assembly 34. The PM filter assembly 34 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PM filter that are not downstream from an activated zone act as stress mitigation zones. For example in FIG. 2, sub-zones 1A, 1B and 1C are activated and sub-zones 2A, 2B, 2C, 3A, 3B, and 3C act as stress mitigation zones.

The corresponding portions of the PM filter downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 3:
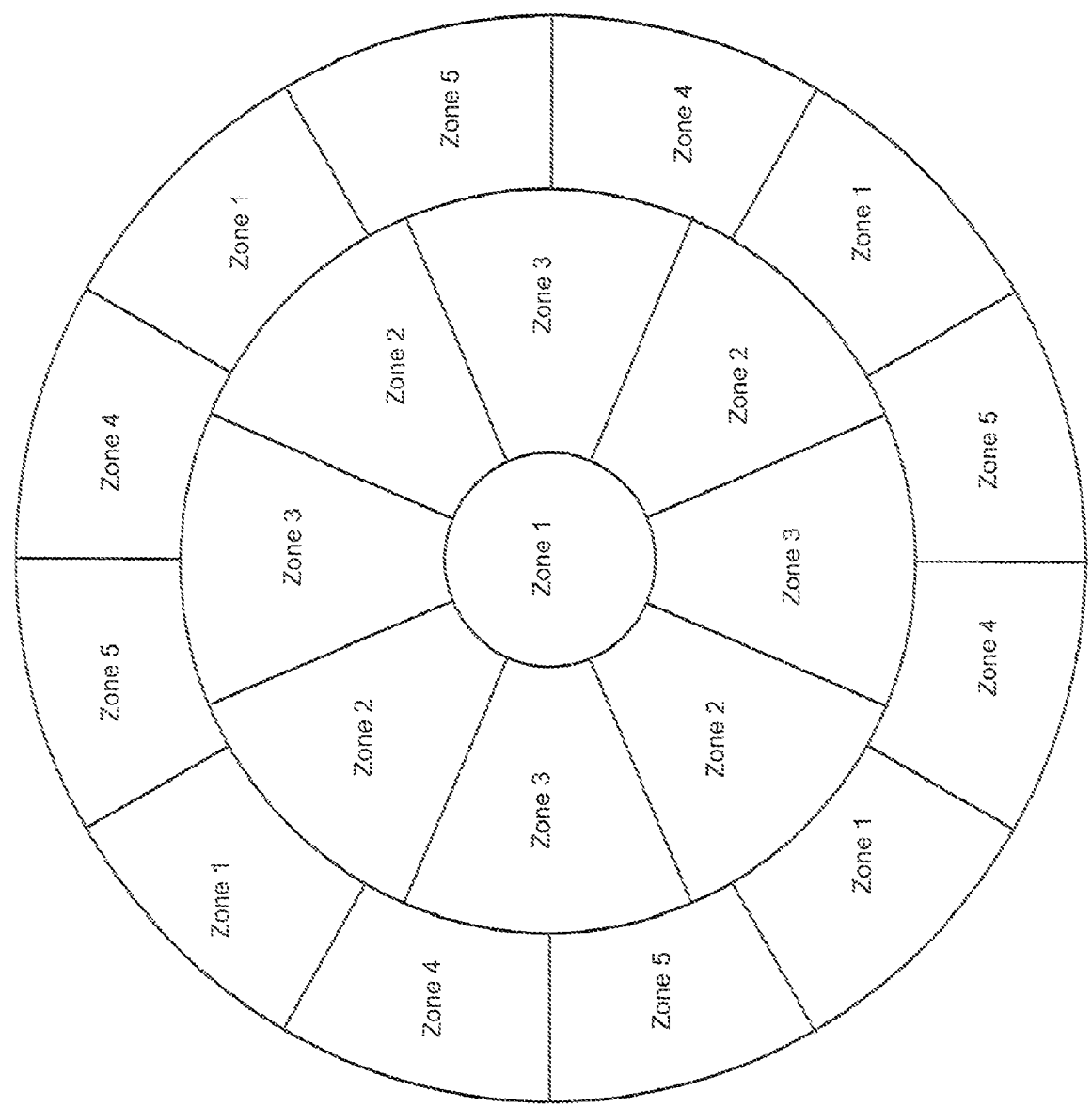
FIG. 3 illustrates exemplary zoning of the zoned inlet heater of the electrically heated PM filter of FIG. 1 in further detail.

Referring now to FIG. 3, another exemplary zoned inlet heater arrangement is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Figure 4:
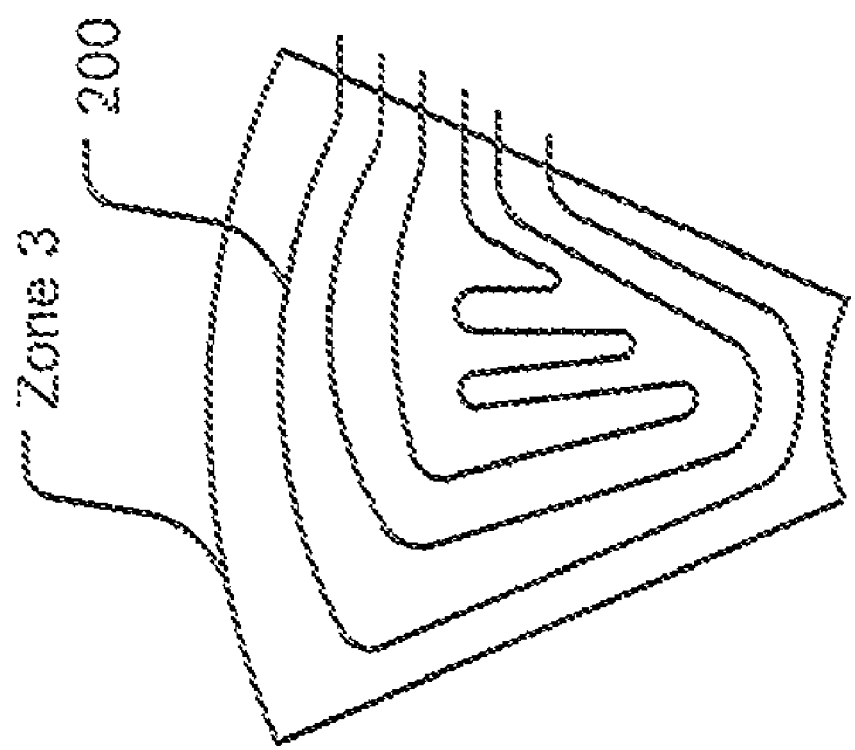
FIG. 4 illustrates an exemplary resistive heater in one of the zones of the zoned inlet heater of FIG. 3.

Referring now to FIG. 4, an exemplary resistive heater 200 arranged adjacent to one of the zones (e.g. zone 3) from the first circumferential band of zones in FIG. 3 is shown. The resistive heater 200 may comprise one or more coils that cover the respective zone to provide sufficient heating.

Figure 5:
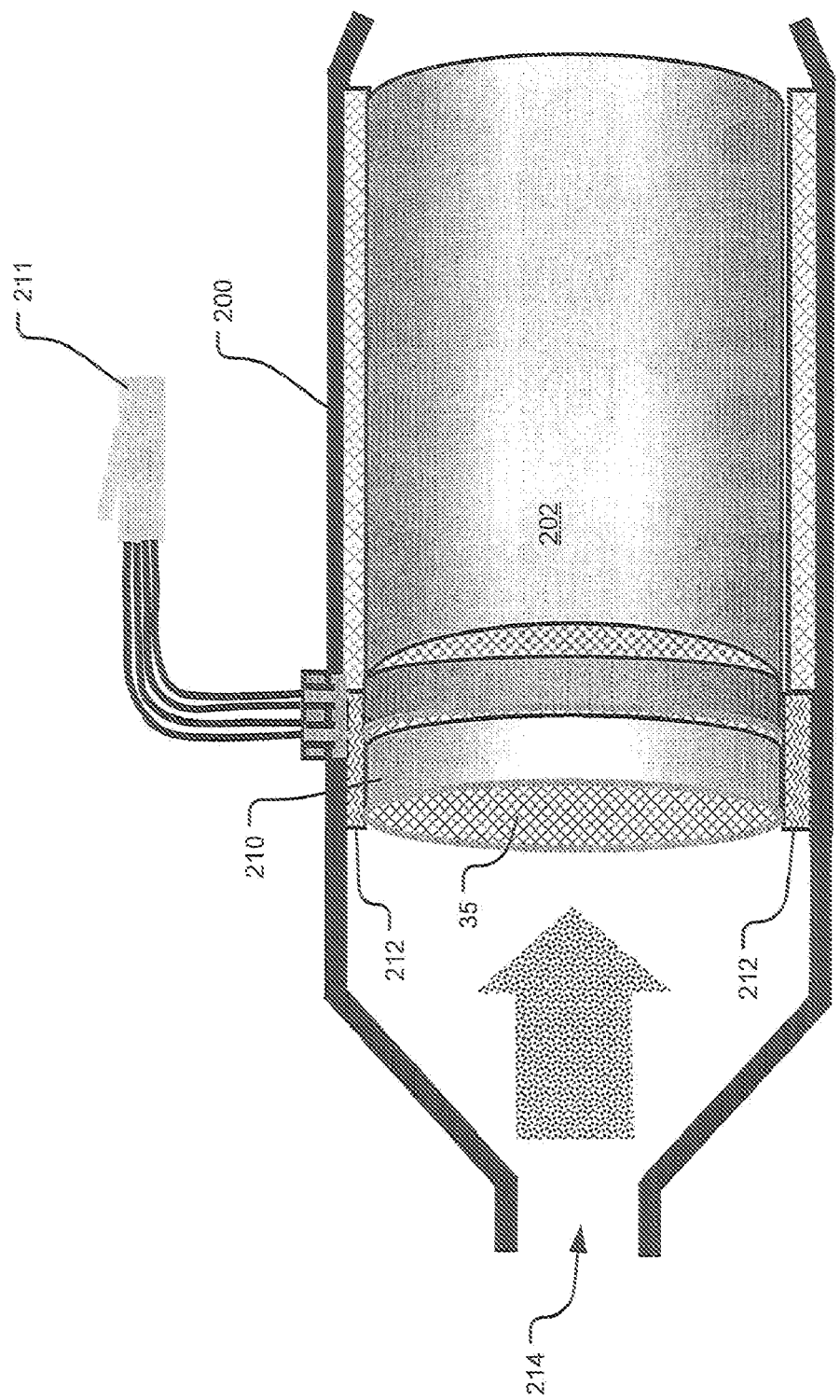
FIG. 5 illustrates the electrically heated PM filter having a zoned electric heater.

Referring now to FIG. 5, the PM filter assembly 34 is shown in further detail. The PM filter assembly 34 includes a housing 200, a filter 202, and the zoned heater 35. The filter 202 may include a rear endplug 208. The heater 35 may be arranged between a laminar flow element 210 and a substrate of the filter 202. An electrical connector 211 may provide current to the zones of the PM filter assembly 34 as described above.

As can be appreciated, the heater 35 may be in contact with or spaced from the filter 202 such that the heating is convection and/or conduction heating. Insulation 212 may be arranged between the heater 35 and the housing 200. Exhaust gas enters the PM filter assembly 34 from an upstream inlet 214 and is heated by one or more zones of the PM filter assembly 34. The heated exhaust gas is received by the filter 202.

Figure 6:
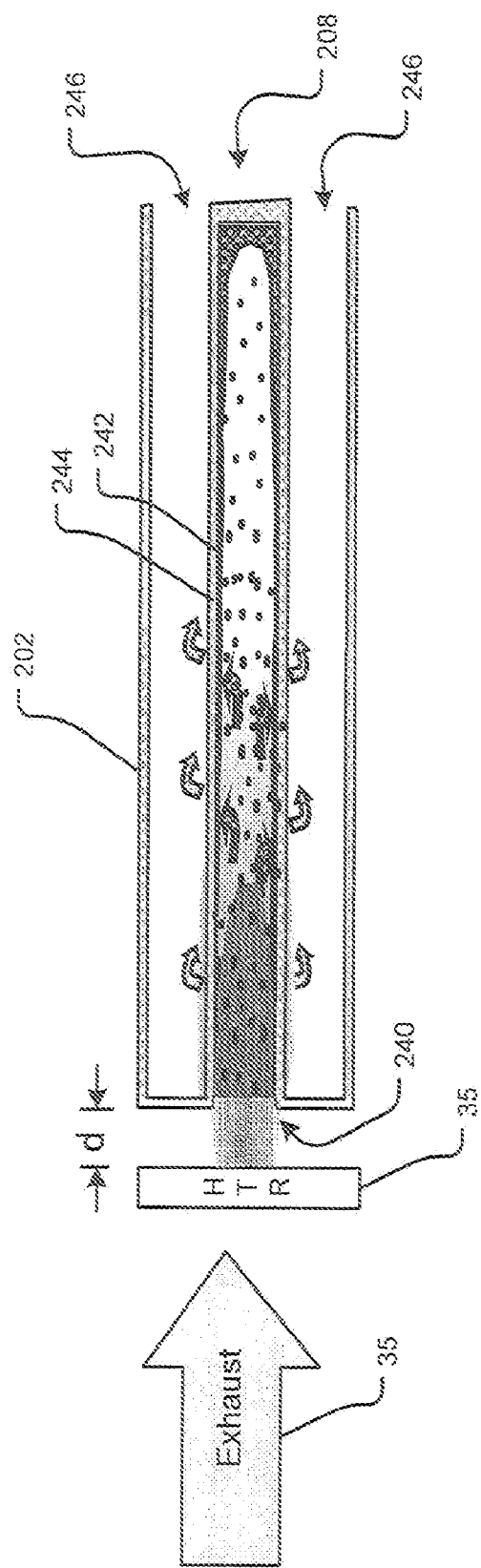
FIG. 6 illustrates heating within the zoned electric heater.

Referring now to FIG. 6, heating within the PM filter assembly 34 is shown in further detail. Exhaust gas 250 passes through the heater 35 and is heated by one or more zones of the heater 35. If spaced from the filter 202, the heated exhaust gas travels a distance "d" and is then received by the filter 202. For example only, the distance "d" may be ½" or less. The filter 202 may have a central inlet 240, a channel 242, filter material 244 and an outlet 246 located radially outside of the inlet. The filter may be catalyzed. The heated exhaust gas causes PM in the filter to burn, which regenerates the PM filter. The heater 35 transfers heat by convection and/or conduction to ignite a front portion of the filter 202. When the soot in the front face portions reaches a sufficiently high temperature, the heater is turned off. Combustion of soot then cascades down a filter channel 254 without requiring power to be maintained to the heater.

Figure 7:
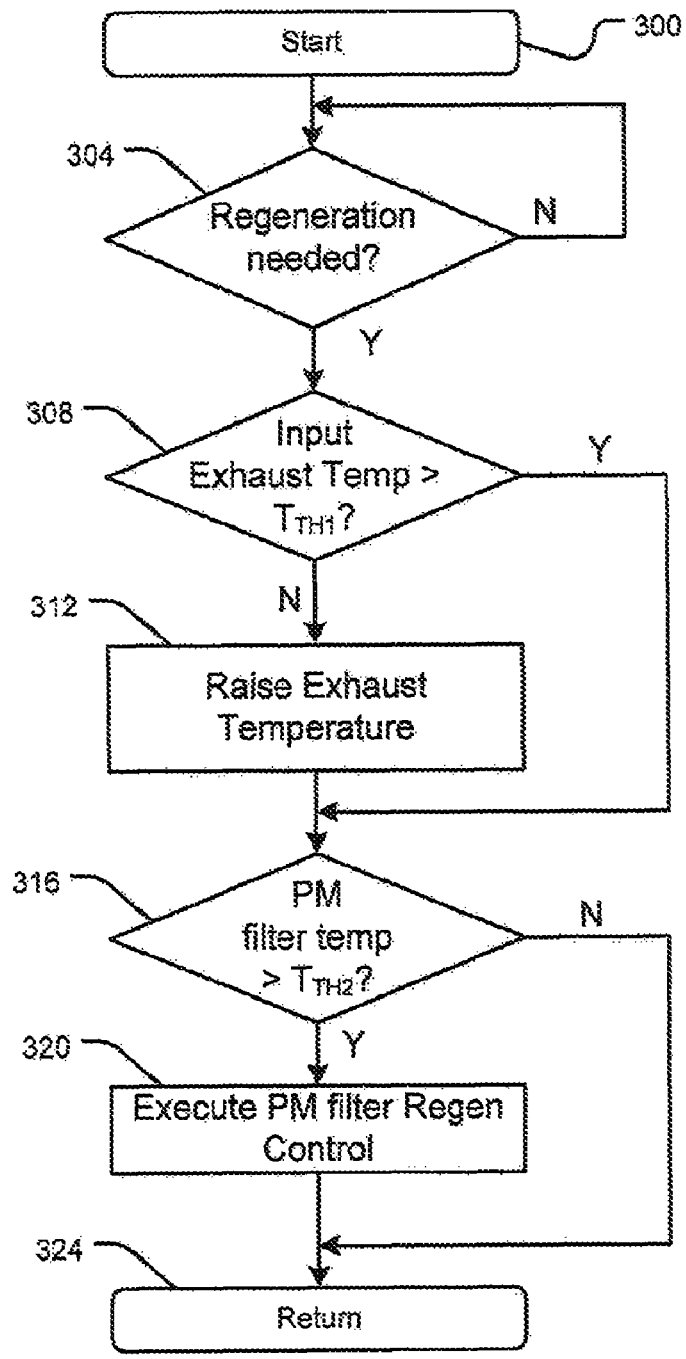
FIG. 7 is a flowchart illustrating exemplary steps performed by the control module to increase exhaust temperature input to the electrically heated PM filter before starting regeneration.

Referring now to FIG. 7, control begins in step 300. In step 304, control determines whether regeneration is needed. If step 308, control determines whether the input exhaust temperature to the PM filter is greater than a first temperature threshold $T_{TH1}$. The first temperature threshold $T_{TH1}$ may be greater than a normal exhaust gas temperature encountered during normal engine operation and less than soot oxidation temperatures. For example only, the first temperature threshold $T_{TH1}$ may be selected in the range between 340-540 degrees Celsius. For example only, the temperature threshold $T_{TH1}$ may be selected in the range between 390-490 degrees Celsius. For example only, the temperature threshold $T_{TH1}$ may be selected in the range between 430-470 degrees Celsius. For example only, the temperature threshold $T_{TH1}$ may be selected to be approximately 440-460 degrees Celsius. As used herein, the term "about" means+/−5 degrees Celsius.

If step 308 is false, the engine control module increases the exhaust temperature using any suitable approach in step 312. Control continues from steps 312 and 308 (if true) with step 316. If step 316 is true, control determines whether the PM filter temperature is greater than a second temperature threshold $T_{TH2}$. If step 316 is true, control executes PM filter regeneration control. Control continues from steps 316 (if false) and step 320 with step 324.

For example only, regeneration temperature in the PM filter may be set to approximately greater than or equal to 600 degrees Celsius. For example only, regeneration temperature in the PM filter may be set to approximately greater than or equal to 700 degrees Celsius. For example only, regeneration temperature in the PM filter may be set to approximately greater than or equal to 800 degrees Celsius.

Figure 8:
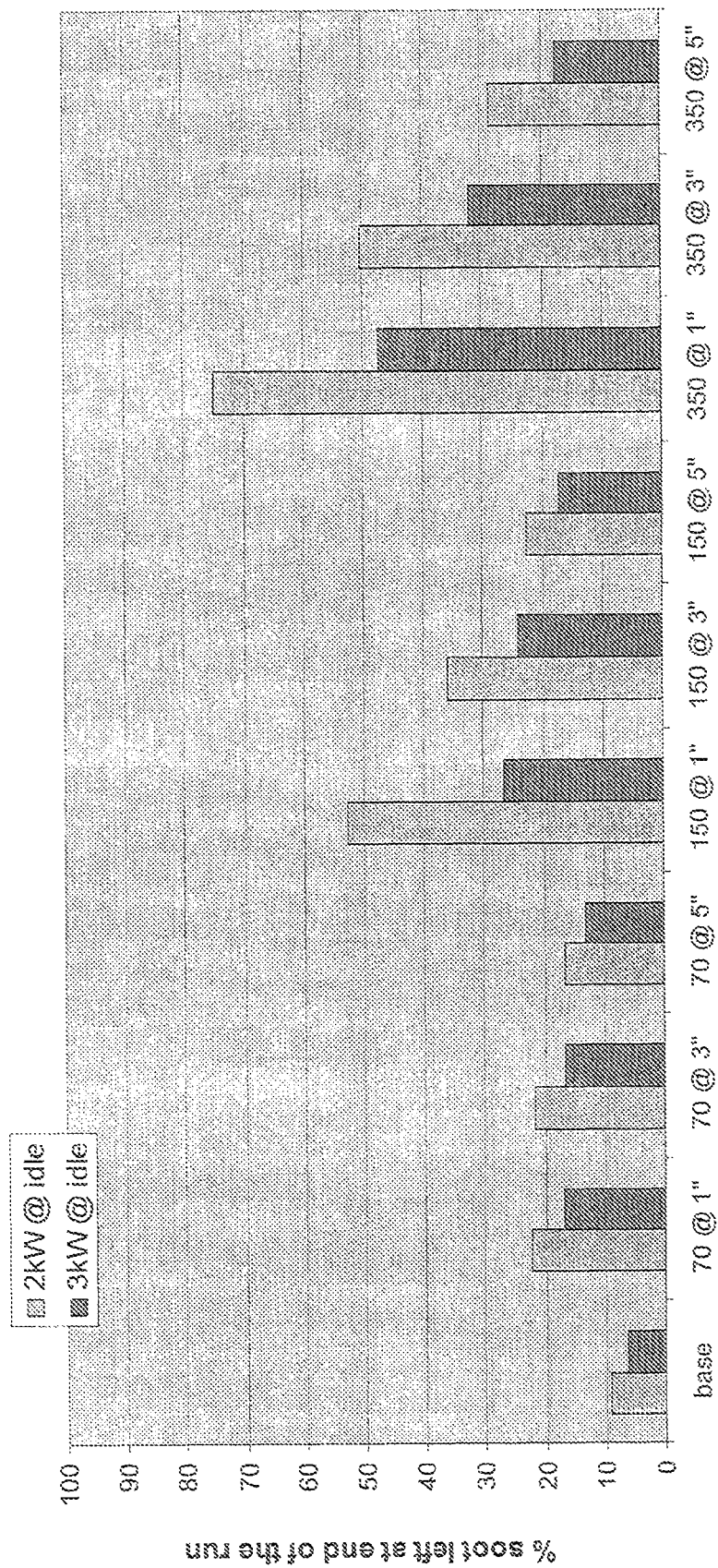
FIG. 8 is a graph illustrating expected percentage soot as a function of inlet exhaust temperature at 300 degrees Celsius for an exemplary engine system.
Figure 9:
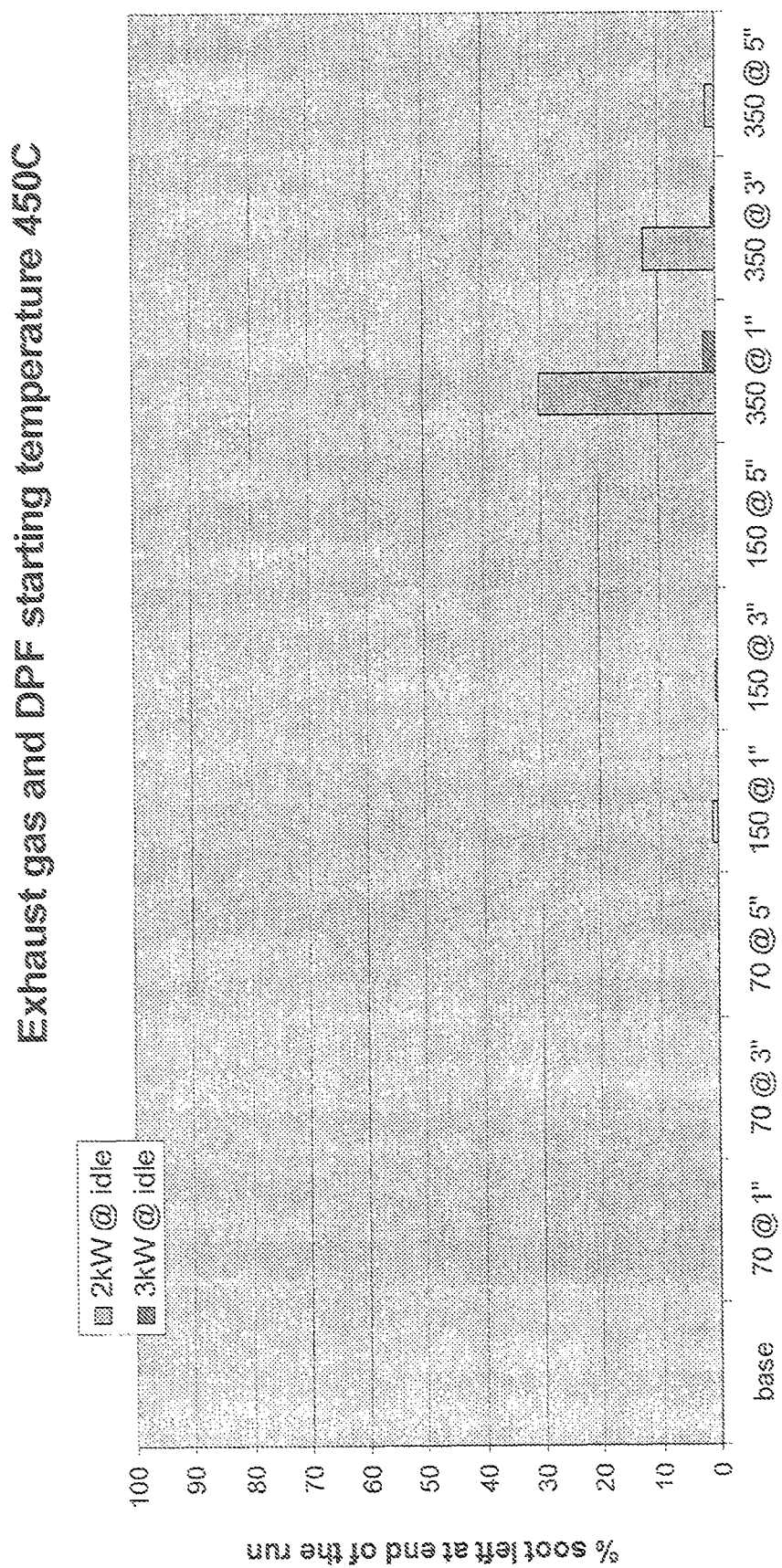
FIG. 9 is a graph illustrating expected percentage soot as a function of inlet exhaust temperature at 450 degrees Celsius for an exemplary engine system.

Referring now to FIGS. 8 and 9, is a graph illustrating percentage soot as a function of an initial inlet exhaust temperature at 300 degrees Celsius and at 450 degrees Celsius, respectively. As can be appreciated, significant improvement in soot levels can be achieved by increasing the initial inlet exhaust gas temperature to a temperature higher than a maximum exhaust gas temperature at the PM filter during non-regeneration operation and less than soot oxidation temperatures.

Figure 10:
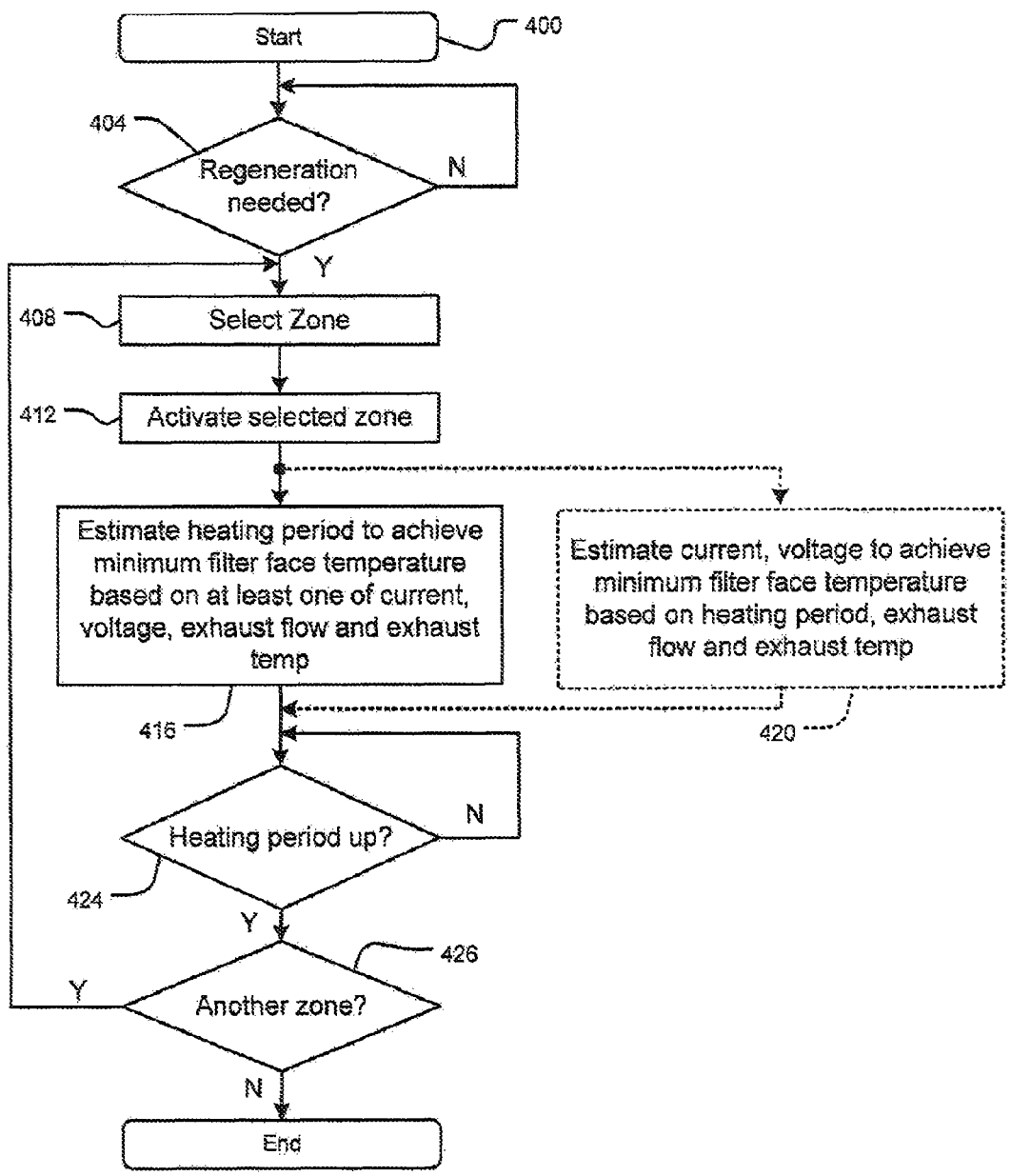
FIG. 10 is a flowchart illustrating exemplary steps for regenerating a zoned electric heater associated with a PM filter.

Referring now to FIG. 10, exemplary steps for regenerating a zoned PM filter are shown. In step 400, control begins and proceeds to step 404. If control determines that regeneration is needed in step 404, control selects one or more zones in step 408 and activates the heater for the selected zone in step 412. In step 416, control estimates a heating period sufficient to achieve a minimum filter face temperature based on at least one of current, voltage, exhaust flow and exhaust temperature. The minimum face temperature should be sufficient to start the soot burning and to create a cascading effect. For example only, the minimum face temperature may be set to 700 degrees Celsius or greater. In an alternate step 420 to step 416, control estimates current and voltage needed to achieve minimum filter face temperature based on a predetermined heating period, exhaust flow and exhaust temperature.

In step 424, control determines whether the heating period is up. If step 424 is true, control determines whether additional zones need to be regenerated in step 426. If step 426 is true, control returns to step 408. Otherwise control ends.

The present disclosure tends to improve regeneration of PM filters. The approach described herein tends to reduce thermal delta and therefore improves substrate durability. Force due to thermal expansion and contraction is defined as $\alpha \Delta TE(Area)$ where $\alpha$ is a coefficient of expansion, E is Young's Modulus, Area is perimeter area and is equal to $\Pi D$, and $\Delta T$ is the temperature delta. As can be appreciated, increasing exhaust gas temperature before using the electrical heaters reduces $\Delta T$, which reduces force due to thermal expansion and contraction. The present disclosure also tends to provide more consistent heating patterns and to reduce flameout.

What is claimed is:

1. A system comprising:
   an electrical heater comprising N zones, wherein N is an integer greater than one;
   a particulate matter (PM) filter that is arranged one of adjacent to and in contact with said electrical heater, wherein said PM filter comprises N longitudinal portions that each extend along a length of said PM filter, and wherein said N portions of said PM filter are associated with said N zones of said electrical heater, respectively; and
   a control module that selectively increases an exhaust gas temperature of an engine to a first temperature using one of (i) a fuel burner and (ii) a catalytic oxidizer with post-combustion fuel injection, and that initiates regeneration in one of said N longitudinal portions of said PM filter using said electrical heater while said exhaust gas temperature is above said first temperature,
   wherein said first temperature is greater than a maximum exhaust gas temperature at said PM filter during normal operation of said engine and is less than an oxidation temperature of said PM.

2. The system of claim 1 wherein said control module sequentially initiates regeneration in each of said N longitudinal portions.

3. The system of claim 1 further comprising said engine, wherein said engine includes a diesel engine.

4. The system of claim 1 wherein said first temperature is greater than about 340 degrees Celsius and less than about 540 degrees Celsius.

5. The system of claim 1 wherein said first temperature is greater than about 390 degrees Celsius and less than about 490 degrees Celsius.

6. The system of claim 1 wherein said first temperature is greater than about 430 degrees Celsius and less than about 470 degrees Celsius.

7. The system of claim 1 wherein said first temperature is greater than about 440 degrees Celsius and less than about 460 degrees Celsius.

8. A method comprising:
   providing an electrical heater comprising N zones, wherein N is an integer greater than one;
   arranging a particulate matter (PM) filter one of adjacent to and in contact with said electrical heater, wherein said PM filter comprises N longitudinal portions that each extend along a length of said PM filter, and wherein said N longitudinal portions of said PM filter are associated with said N zones of said electrical heater, respectively;
   selectively increasing an exhaust gas temperature of an engine to a first temperature using one of (i) a fuel burner and (ii) a catalytic oxidizer with post-combustion fuel injection; and
   initiating regeneration in one of said N longitudinal portions of said PM filter using said electrical heater while said exhaust gas temperature is above said first temperature,
   wherein said first temperature is greater than a maximum exhaust gas temperature at said PM filter during normal operation of said engine and is less than an oxidation temperature of said PM.

9. The method of claim 8 further comprising sequentially initiating regeneration in each of said N longitudinal portions.

10. The method of claim 8 wherein said engine includes a diesel engine.

11. The method of claim 8 wherein said first temperature is greater than about 340 degrees Celsius and less than about 540 degrees Celsius.

12. The method of claim 8 wherein said first temperature is greater than about 390 degrees Celsius and less than about 490 degrees Celsius.

13. The method of claim 8 wherein said first temperature is greater than about 430 degrees Celsius and less than about 470 degrees Celsius.

14. The method of claim 8 wherein said first temperature is greater than about 440 degrees Celsius and less than about 460 degrees Celsius.

15. The system of claim 1, wherein said control module initiates regeneration in said one of said N longitudinal portions of said PM filter by activating a corresponding one of said N zones of said electrical heater to a second temperature, wherein said second temperature is greater than said first temperature.

16. The system of claim 15, wherein when regeneration of said PM filter has not completed after a predetermined period, said control module initiates regeneration in another one of said N longitudinal portions of said PM filter by activating a corresponding one of said N zones of said electrical heater to the second temperature.

17. The system of claim 16, wherein said second temperature is greater than 800 degrees Celsius.

18. The method of claim 8, wherein initiating regeneration in said one of said N longitudinal portions of said PM filter includes activating a corresponding one of said N zones of said electrical heater to a second temperature, wherein said second temperature is greater than said first temperature.

19. The method of claim 18, further comprising when regeneration of said PM filter has not completed after a predetermined period, initiating regeneration in another one of said N longitudinal portions of said PM filter by activating a corresponding one of said N zones of said electrical heater to the second temperature.

20. The method of claim 19, wherein said second temperature is greater than 800 degrees Celsius.

* * * * *